Patented Apr. 13, 1954

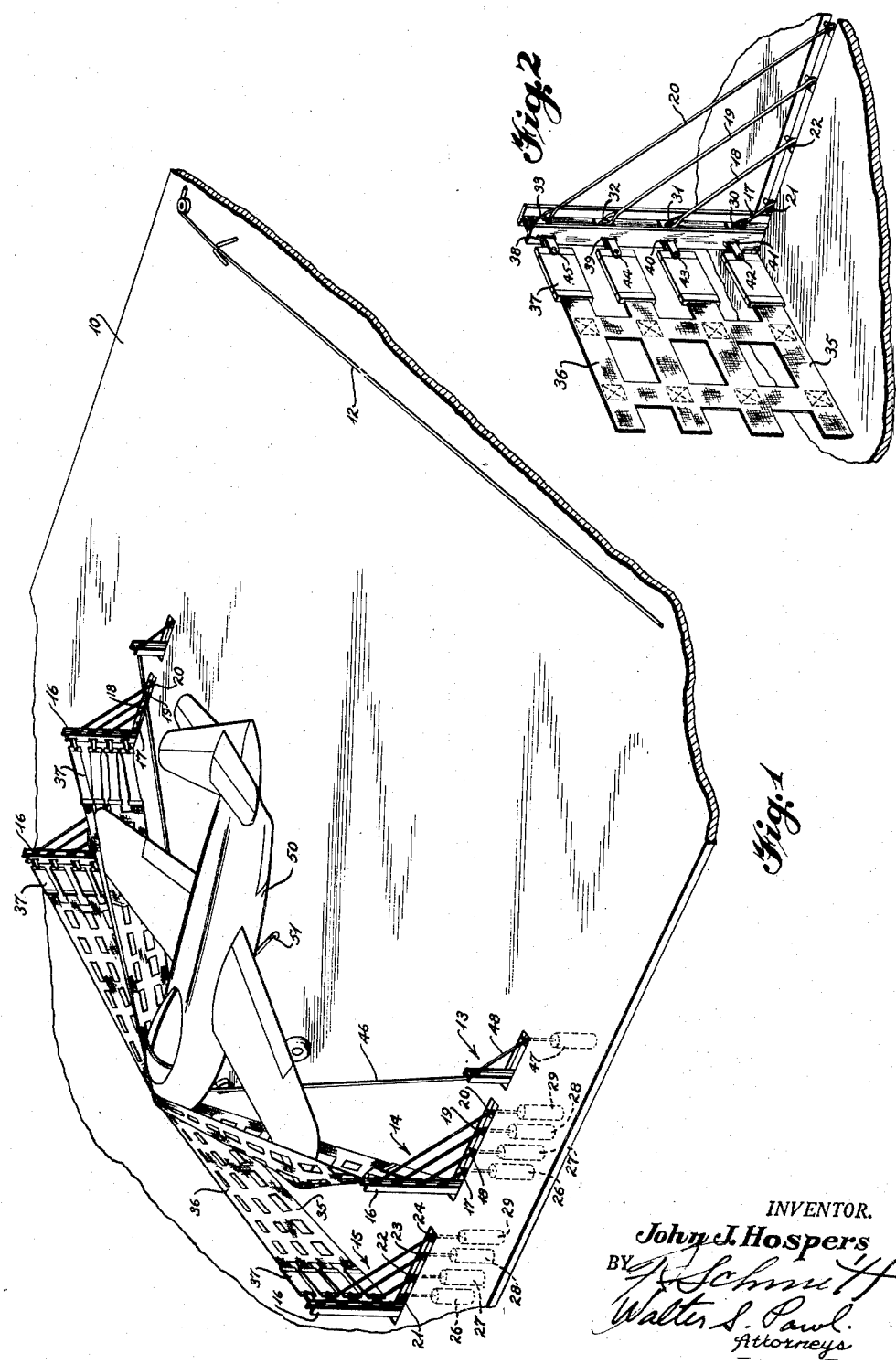

2,675,197

UNITED STATES PATENT OFFICE 2,675,197

CRASH BARRIER FOR AIRCRAFT CARRIERS

John J. Hospers, Dallas, Tex., assignor, by mesne assignments, to Chance Vought Aircraft, Incorporated, a corporation of Delaware Application September 20, 1950, Serial No. 185,808

7 Claims. (Cl. 244—110)

This invention relates to an aircraft barrier device suitable for use as a permanent installation on aircraft carriers. It may be used alone or positioned forwardly of the known arresting gear cables for situations where the airplane misses these cables in a landing operation.

More particularly, the invention is directed to one or more separate barriers placed in parallel relationship and each comprised of a heavy grill formed from strong webbing such as woven fibreglass or synthetic leather such as fabrikoid material. These webbings may approximate 12 inches in width and are held in place at each end by several shock absorbers composed of triple thickness fibreglass or fabrikoid swively attached to mounting posts.

The mounting posts may be pivoted at one end to the deck structure so as to lay flush with the deck when not in use. When the mounting or carrier posts are erect as shown additional pivotal movement is resisted by a number of retractable cables connected to separate hydraulic pistons located in the arresting gear room below. The posts may be caused to maintain their erect position by counter weighting, springs, or other convenient means not shown.

The strips of webbing may be joined as by pattern sewing at the intersections or by sewing combined with adhesives with the result that a substantially permanent, readily constructed and yielding shock absorber is provided. The devices are especially suitable for aircraft of the jet-propelled type where no propellers are involved. A lower arresting cable may be positioned immediately forwardly of the grill barriers so as to engage the nose wheel strut as will be more fully described.

An object of invention is to provide an effective barrier for aircraft.

Another object is to provide a strong yielding barrier, the control portion of which is composed of a heavy webbing material suitably secured to form a grill.

Another object is to provide a series of separate coacting barriers arranged in parallel relation.

Another object is to provide a yielding barrier which will sequentially engage different plane parts and which will exert the greater forces on plane parts best suited to withstand it.

Another object is to provide a web support which is hydraulically controlled to reduce impact shock to the plane.

Another object is to provide a barrier which is swively connected to supporting uprights so as to conform to the contour of the landing plane throughout the period of contact.

These and other objects of invention will be manifest from a consideration of the following description, claims and drawings in which:

Fig. 1 is a schematic fragmentary view of a flight deck of an aircraft carrier and a two main barrier unit and subsidiary unit constructed in accordance with the present invention.

Fig. 2 is a detailed view of a portion of the webbing, the mounting posts, and the ply shock absorbers positioned at the ends of the webbing.

Referring to Fig. 1 in which an aircraft carrier flight deck 10 has mounted on one end a series of conventional arrestor cables such as 12 and auxiliary arresting units 13, 14, and 15 which will stop and absorb the impact of an aircraft which has missed the conventional arrestor cables and so prevent damage to other planes on passage of the landing plane off the flight deck.

As will be seen, the first barrier cable will engage the front wheel strut, and one or more of the webs will contact the nose and subsequently the wings in the manner shown. Additional barriers similar to 14 and 15 may be used, but two are sufficient to illustrate the general operation of the installation.

The structure of the barriers 14 and 15 is identical, each comprising a pair of uprights 16, pivotally mounted to rise out of the flight deck 10 for use. The uprights or mounting posts may be constructed, or acted upon by means not shown, to prevent them from being drawn down by the weight of cables 17, 18, 19, and 20. These cables pass over rollers on pulleys 21, 22, 23, and 24 and are joined to hydraulic pistons such as 26, 27, 28, and 29 in any convenient manner, known per se, so that additional movement of the mounting posts 16 will be resisted by hydraulic fluid or its equivalent and thus absorb the impact shock.

The cables are secured to the uprights as by U bolts, 30, 31, 32, and 33 attached to the uprights. The grill may be considered as having three main parts, a central portion 36 formed by sewing or otherwise securing together webs of woven or otherwise fabricated material such as fibreglass or synthetic materials such as artificial leather or fabrikoid, shock absorber portions 37 of several plies of the same material or different material than the web, and strap or metal connections pivotally fastened to both mounting posts and to the shock absorber portions 37 as shown at 38, 39, 40, 41, 42, 43, 44, and 45 (Fig. 2).

The arrestor unit 13 has a cable 48 joined to hydraulic piston 47 and its component parts operate similarly to the structure above described in detail. Its cable 46 is sufficiently elevated to engage the forward strut of jet aircraft 50 in the manner shown.

As will be seen from the above, an aircraft may miss the usual arresting gear cables such as 12 and will continue along the deck where the first barrier cable will engage the nose wheel strut; the nose, and then the wings of the airplane would next contact the first main barrier webbing; the second and possibly other barrier grills will take some of the impact but are mainly of benefit as safety nets in the event of failure of the first barrier grill. The main shock loads are preferably taken by the absorber 37 at the ends of the webbing grill and by the hydraulic shock absorbers through the cables 17, 18, 19, and 20 attached to the mounting posts.

The plane 50 will usually be provided with a hook such as 51 for engagement with the conventional arresting cables. It may be used to engage a manually operated hook (not shown) to withdraw the aircraft from the barrier after it has stopped.

A webbing constructed as shown may conveniently be about 8 feet high which height can of course be varied to suit a particular condition. It will be noted that the grill portion is distorted by the plane impact to effectively "pocket" the contacting plane parts in a manner which will distribute the impact force and thus reduce to a minimum the danger of structural failures to the aircraft on the unit.

The shock absorbers 37, being heavier than the grill, more nearly retain their original shape and because of the pivotal action and elongation induced by the impact automatically adjust themselves to the requirements of the particular occasion. These shock absorbers are connected to individual webs which may be approximately 12 inches wide and spaced 18 inches apart. It will be seen that this end construction contributes to the deformability of the wide webbed grill under conditions of use. It is also clear that rods may be substituted for the cables 17, 18, 19, 20, and serve as piston rods. It is not essential to the broad concept of the invention that the mounting posts be pivotally moveable into a position flush with the flight deck.

The present improvements have been described in connection with the illustrated embodiment. It is not designed to be limited to such embodiment but rather only by the broad scope of the appended claims and their equivalents.

The invention described herein may be manufactured and used by or for the Government of the United States of America for governmental purposes without the payment of any royalties thereon or therefor.

What is claimed is:

1. A barrier comprising pivotally mounted supporting posts, a deformable web formed grill suspended vertically between said posts, said grill having a plurality of vertically spaced webs forming its free ends, vertically spaced shock absorbing means secured to each of said spaced webs and means for swively connecting said shock absorbing means individually to the supporting posts, and means for yieldingly resisting movement of said supporting posts from shock impact on the said grill.

2. The combination of claim 1 further defined by said grill being formed of equally spaced horizontal and vertical web strips sewn together at their intersections.

3. The combination of claim 1 further defined by said grill and said shock absorbing means being formed of synthetic fiber material.

4. The combination of claim 1 further defined by said last mentioned means comprising vertically spaced cables each attached at one end to its respective supporting post and at the other end to hydraulic piston means.

5. A barrier comprising pivotally mounted supporting posts, a deformable web formed grill suspended vertically between said posts, said grill having a plurality of vertically spaced webs forming its free ends, vertically spaced shock absorbing means secured to each of said spaced webs and means for swively connecting said shock absorbing means individually to the supporting posts, means for yieldingly resisting movement of said supporting posts from shock impact on the said grill, supplemental posts spaced forwardly of and parallel to said mounting posts, and a deformable cable suspended between said supplemental posts at a height intermediate the distance between the top and bottom of said grill.

6. The combination of claim 5 further defined by said supplemental posts having means attached thereto for yieldingly resisting movement of said supplemental posts from shock impact on the said cable.

7. The combination of claim 2 further defined by supplemental posts spaced forwardly of and parallel to said mounting posts, and a deformable cable suspended between said supplemental posts at a height intermediate the distance between the top and bottom of said grill.

References Cited in the file of this patent

UNITED STATES PATENTS

| Number | Name | Date |
| --- | --- | --- |
| 1,865,297 | Bateman | June 28, 1932 |
| 2,440,574 | Cotton | Apr. 27, 1948 |
| 2,450,328 | Cotton | Sept. 28, 1948 |
| 2,465,936 | Schultz | Mar. 29, 1949 |
| 2,475,588 | Bierman | July 12, 1949 |

FOREIGN PATENTS

| Number | Country | Date |
| --- | --- | --- |
| 578,440 | Great Britain | June 28, 1946 |